US00RE33860E

United States Patent [19]

Chen

[11] E Patent Number: Re. 33,860

[45] Reissued Date of Patent: Mar. 31, 1992

[54] FOUNTAIN SHAVING DEVICE

[76] Inventor: Teng-Mo Chen, 218 Cecil, Kingsville, Tex. 78363

[21] Appl. No.: 575,510

[22] Filed: Aug. 30, 1990

Related U.S. Patent Documents

Reissue of:

[64] Patent No.: 4,813,138
Issued: Mar. 21, 1989
Appl. No.: 198,000
Filed: May 24, 1988

[51] Int. Cl.[5] ..... B26B 21/44

[52] U.S. Cl. ..... 30/41; 30/86; 222/391

[58] Field of Search ..... 30/41, 86, 32, 34.05, 30/90; 222/402.13, 391, 402.11

[56] References Cited

U.S. PATENT DOCUMENTS

| | | | |
|---|---|---|---|
| 2,327,192 | 8/1943 | Keene | 30/86 |
| 3,417,468 | 12/1968 | Miyauchi | 30/41 |
| 3,981,597 | 9/1976 | Cohn | 401/190 |
| 4,023,269 | 5/1977 | Lopez, Jr. | 30/41 |
| 4,252,455 | 2/1981 | de la Pena | 401/190 |
| 4,479,592 | 10/1984 | Rüsing et al. | 222/391 |
| 4,625,402 | 12/1986 | Kavoussi | 30/41 |

FOREIGN PATENT DOCUMENTS

| | | |
|---|---|---|
| 1163978 | 9/1969 | United Kingdom . |
| 1181305 | 2/1970 | United Kingdom . |
| 1429403 | 3/1976 | United Kingdom . |
| 1549917 | 8/1979 | United Kingdom . |
| 2038952 | 7/1980 | United Kingdom . |
| 2080884 | 2/1982 | United Kingdom . |

*Primary Examiner*—Douglas D. Watts
*Attorney, Agent, or Firm*—Lisa & Lisa

[57] ABSTRACT

A fountain shaving device includes an aerosol container of shaving cream, a brush mounted on a first end portion of the aerosol container, a razor having a blade cartridge having blades therein mounted on a second end portion of the container opposite to the brush, and a dispenser controller formed on a brush base having a longitudinal tube linearly connected with a stem of the aersol valve and transversely formed with a lateral wedge portion tapered downwardly outwardly in slidable engagement with another wedge portion tapered upwardly inwardly formed on a lateral push button so that upon a depression of the push button, the two wedge portions may be effected to lower the controller tube and valve stem to open the aerosol valve for conveniently dispensing cream directly into the brush bristles.

9 Claims, 2 Drawing Sheets

FOUNTAIN SHAVING DEVICE

Matter enclosed in heavy brackets [ ] appears in the original patent but forms no part of this reissue specification; matter printed in italics indicates the additions made by reissue.

BACKGROUND OF THE INVENTION

Lorenzo Lopez, Jr. disclosed a shaving device in his U.S. Pat. No. 4,023,269 including a razor blade and a supply of shaving cream in a device for convenient shaving. However, such a conventional shaving device has the following drawbacks in use:

1. Even the operator 81 is depressed to open a valve of the aerosol container 18, the valve stem is not made as an inclined surface to mate with the inclined surface of the operator 81 as shown in his FIG. 2 so that a heavier force is required to depress the operator 81 bearing against a strong force exerting on an acute edge of the valve stem resiliently actuated by a valve spring inside the aerosol container.

2. By depressing the operator 81 to push the valve stem inwardly through the opening 20, a shaving cream will be discharged through the passageway 52 towards the brush 36, of which the passageway 52 is very long to easily cause contamination or curing of the cream as kept in the passageway.

3. When the operator 81 is suddenly released from the seals 84, the acute edge of the valve stem as tensioned by a valve spring and the pressurized cream in the aerosol container 18 may forcibly bias (or even brake) an inner end of the operator 81 to slow down the recovery or outward protruding of the operator, especially frictionally held by packing seals 84, thereby possibly causing cream leakage due to a difficulty for sharply closing the aerosol valve.

The present inventor has found the drawbacks of the conventional shaving device and invented the present fountain shaving device overcoming the above-mentioned drawbacks.

SUMMARY OF THE INVENTION

The object of the present invention is to provide a fountain shaving device including a brush mounted on one end of an aerosol container of shaving cream, a razor means mounted on the other end of the aerosol container, and a push-button controller operatively depressible for opening an aerosol valve for directly discharging a shaving cream from the aerosol container into the brush bristles for convenient shaving purpose.

DETAILED DESCRIPTION

Figure 1:
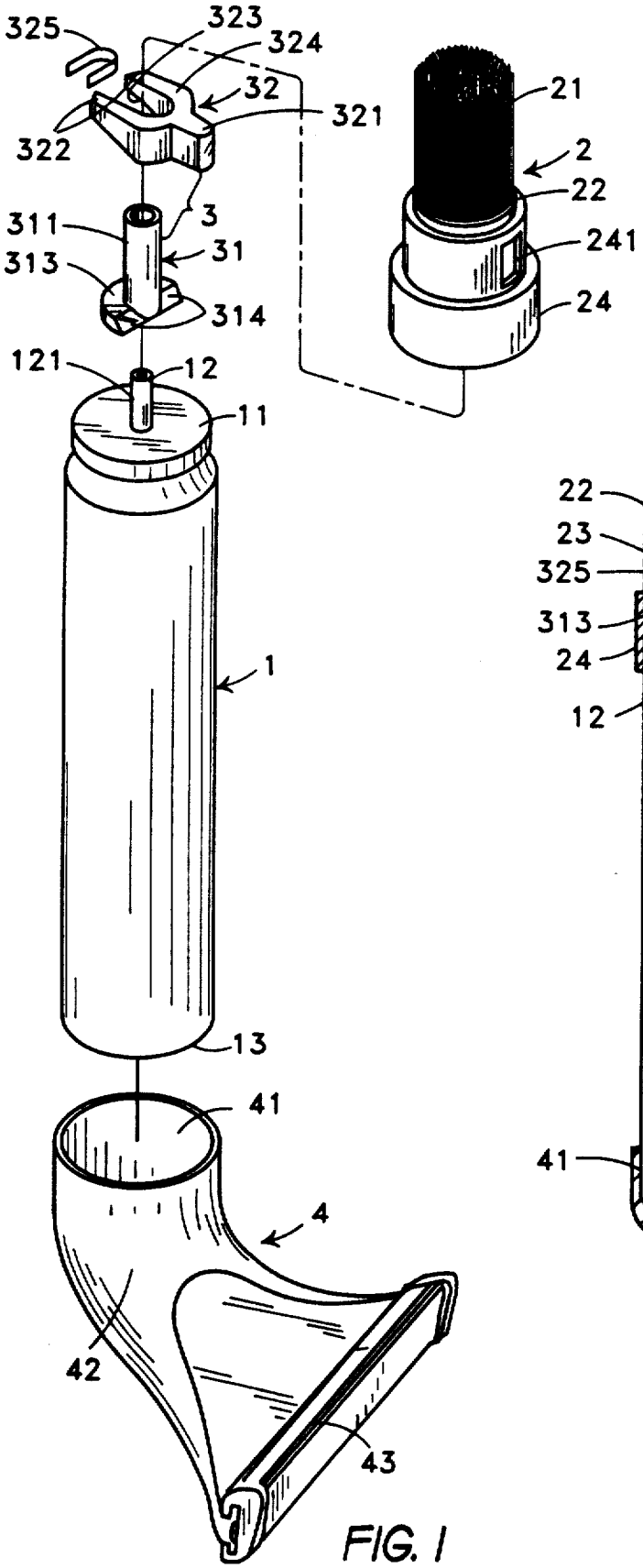
FIG. 1 is a perspective illustration showing all elements in construction of the present invention.
Figure 2:
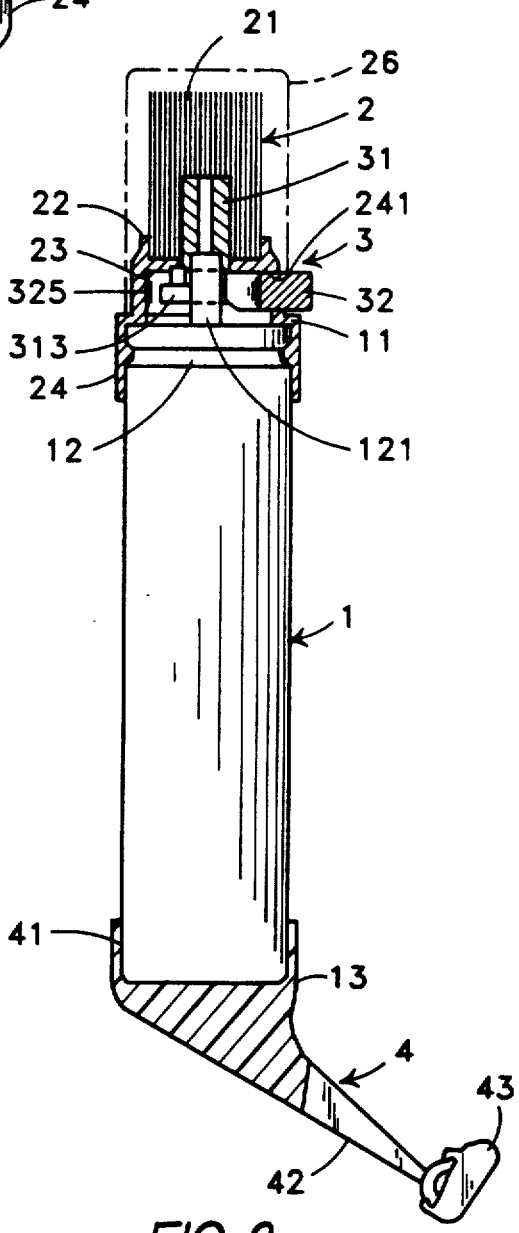
FIG. 2 is a sectional drawing of the present invention, when assembled.
Figure 3:
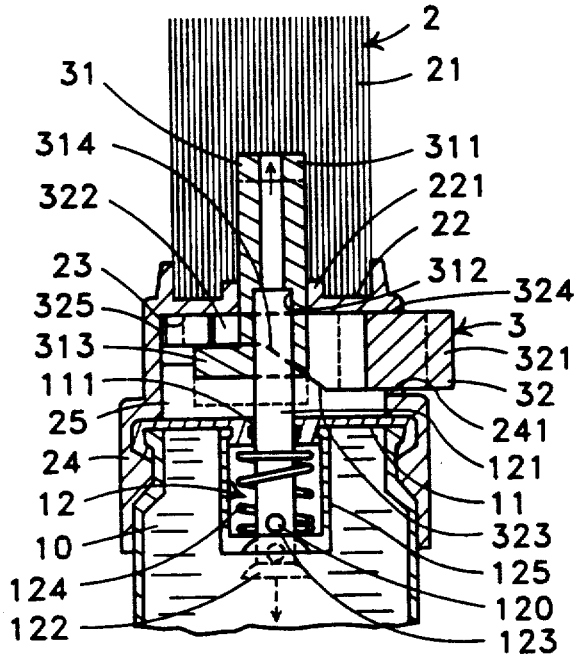
FIG. 3 is a sectional drawing showing a mechanism for dispensing shaving cream in accordance with the present invention.

As shown in FIG. 1-3, the present invention comprises: an aerosol container of shaving cream 1 also serving as a handle, a brush means 2 mounted on a first end portion 11 of the container 1, a shaving-cream despensing controller 3 mounted on the first end portion 11 of the container 1 and mounted in the brush means 2, and a razor means 4 mounted on a second end portion 13 of the container 1 opposite to the first end portion 11.

The aerosol container of shaving cream 1 includes: an aerosol valve 12 mounted in the first end 11 of the aerosol container 1 having a central hollow stem 121 longitudinally reciprocatively mounted in a central opening 111 of the first end portion 11 normally protruding outwardly as retained by a tensioning spring 124 seated on a cartridge 125, a lower plug 122 formed on a lowest end of the stem 121 operatively sealing a valve opening or seat 123 of a valve cartridge 125 internally secured to the first end portion 11, and a cream outlet port 120 formed in a lower portion of the stem positioned above the plug 122 and being normally excluded from any inlet cream by closing the plug 122 on the seat 123 of the valve cartridge 125. The valve 12 can be selected from any other conventional designs or modifications to have a central hollow stem 121 operatively depressible for opening the valve, and normally protruding outwardly from the container 1 without depressing of the stem 121.

The razor means 4 includes a socket 41 for mounting a second end portion 13 of the container opposite to the brush means 2 and a holder portion 42 for connecting a blade cartridge 43 containing shaving blades thereon.

The brush means 2 includes a plurality of bristles 21 planted on a base plate 22, and a cylindrical portion 24 formed under the base plate 22 secured to the first end portion 11 of the container 1, defining a cylindrical chamber 25 among a bottom flat surface 23 of the base plate 22, the first end portion 11 of the container and an inside wall of the cylindrical portion 24 to generally encase the dispensing controller 3 in the chamber 25. A cover 26 may be provided to protect the bristles.

The shaving-cream dispensing controller 3 is an essential means of the present invention and includes: a longitudinal dispenser 31 and a lateral actuator 32.

The longitudinal dispenser 31 includes a central guide tube 311 having its inner tubular hole coaxially engaged with the central hollow stem 121 of the aerosol valve 12 having an annular extension 312 of the tube 311 engaged with an upper edge of the stem 121, and a disk portion 313 formed on a lower end of the tube 311 perpendicular to the tube 311 having a first inclined surface 314 tilting downwardly outwardly.

The lateral actuator 32 generally perpendicular to the dispenser tube 311 includes a push-button portion 321 normally protruding outwardly through a slot 241 formed in the cylindrical portion 24; a bifurcate wedge portion 322 protruding inwardly opposite to the push-button portion 321 to tangentially dispose around the tube 311, having an upper flat surface 324 coplanar to an upper flat surface of the push-button portion 321 laterally sliding along the bottom flat surface 23 of the brush base plate 22 and having a second inclined surface 323 formed on a bottom of the wedge portion 322 tilting upwardly inwardly to be slidably engageable with the first inclined surface of the longitudinal dispenser 31; and a restoring spring plate 325 retained between the bifurcate wedge portion 322 and an inside wall of the cylindrical portion 24 normally pushing the actuator 32 outwardly to protrude the push-button portion 321 beyond the slot 241. The brush means 2 may further include a cap 26 for hygienic purpose.

The central guide tube 311 has its outer tubular wall reciprocatively engaged in a shallow jacket 221 formed in a central portion of the base plate 22, The guide tube 311 is fluidically communicated with the central hollow stem 121 and has its upper end poking into a bundle of bristles 21 of the brush means 2.

When using the present invention for shaving purpose, the push-button portion 321 is depressed inwardly as shown in FIG. 3 to allow the second inclined surface 323 to thrust the first inclined surface 314 of the longitudinal dispenser 31 downwardly to lower the central stem 121 of the aerosol valve 12, thereby discharging a shaving cream 10 through the port 120, the stem 121 and the tube 311 into the brush bristles 21 for direct distribution of cream onto a man's skin. When releasing the push-button portion 321, the spring 124 will resiliently raise the stem 121 and the dispenser 313 to allow the first inclined surface 314 to thrust the second inclined surface 323 of the lateral actuator 32 to recover the outward protrusion of the push-button portion 321, also laterally restored by the spring plate 325.

Naturally, the spring plate 325 may also be omitted when the aerosol spring 124 is strong enough.

Figure 4:
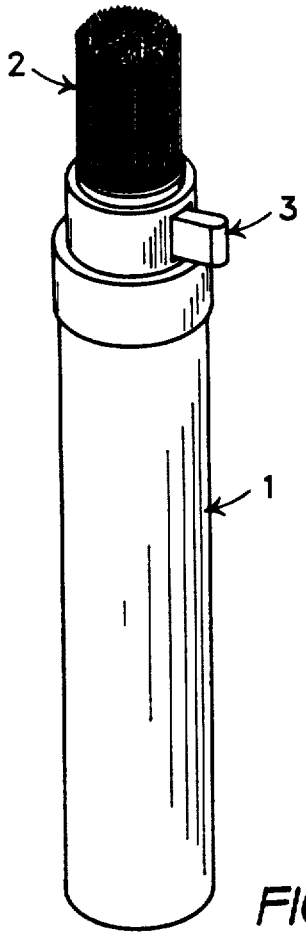
FIG. 4 is a perspective view of the present invention without mounting a blade cartridge means.

As shown in FIG. 4, the razor means 4 may be omitted so that the brush 2 is mounted on an aerosol container 1 filled with shaving cream.

Figure 5:
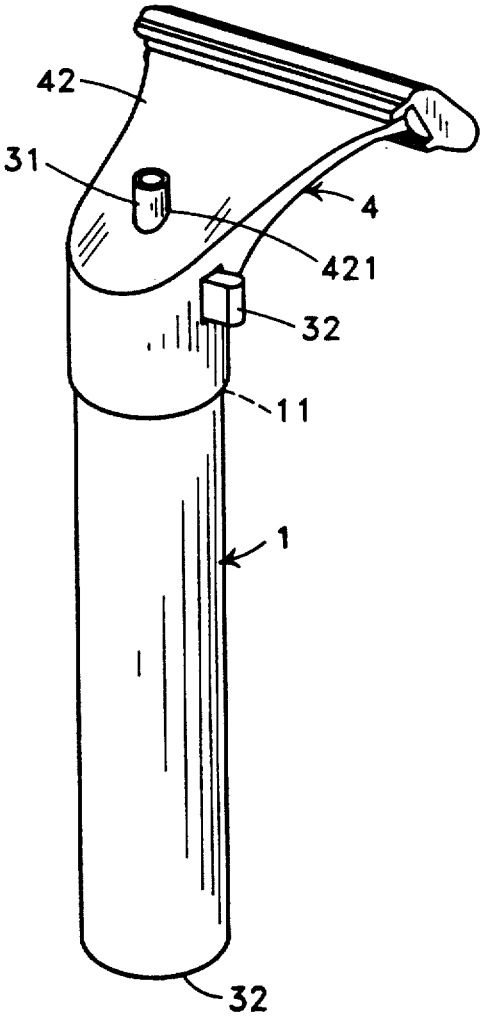
FIG. 5 shows another application of the present invention.

As shown in FIG. 5, the razor means 4 is mounted on the first end plate 11 of aerosol container 1, The holder portion 42 of the razor means 4 may be formed with a tube hole 421 therein to substitute the shallow jacket 221 of the brush means 2 so that the tube 311 is reciprocatively operated in the hole 421 when depressing or releasing the push-button portion 321.

The present invention has the following advantages superior to a conventional shaving device such as taught by Lopez's U.S. Pat. No. 4,023,269;

1. The shaving cream is directly and immediately distributed into the brush bristles by merely push button operation for convenient and hygienic using of cream.

2. The longitudinal (vertical) dispenser tube 311 coaxially linearly connected with the aerosol valve stem 121, both tube 311 and stem 121 slidingly held in two plates 22, 11, can be stably operated without causing a serious braking or twisting action between the lateral push button and the aerosol valve stem, when slidably thrusting the two inclined surfaces 314, 323 by depressing or releasing the push button 321.

3. The bifurcate wedge portion 322 of the lateral actuator has two arms tangentially disposing around the central tube for ensuring a sharply slidable engagement of the two inclined surfaces 323, 314, as assisted by a stable lateral sliding movement of the actuator 32 transversely reciprocating in the chamber 25 of the cylindrical portion 24 of the brush means 2, so that a transverse (horizontal) movement of the actuator 32 is very stable in commensuration of a stable longitudinal (vertical) movement of the dispenser 31, resulting in a very smooth depression operation of push button when opening an aerosol valve or a smooth recovery of push button when closing the valve.

The lateral actuator 32 of the dispensing controller 3 can be modified to have variable adjusting means, such as by forming scales on the actuator (not shown) or other stepwise control means so as to adjust the discharge quantity of shaving cream.

I claim:

1. A fountain shaving device comprising:

an aerosol container of shaving cream serving as a handle having a first end portion provided with an aerosol valve therein, having a central hollow stem of the aerosol valve longitudinally protruding outwardly in said first end portion depressible for opening the aerosol valve for discharging the shaving cream outwardly through said hollow stem, and having a second end portion on a bottom side of said container opposite to said first end portion;

a razor means mounted on said second end portion having a blade cartridge mounted thereon;

a brush means having a plurality of bristles planted on a base plate and a cylindrical portion formed under said base plate secured to said first end portion of said aerosol container; and a shaving-cream dispensing controller generally formed in said cylindrical portion of said brush means, the improvement which comprises:

said shaving-cream dispensing controller including a longitudinal dispenser having a central guide tube with its upper end poking into a bundle of brush bristles and having its lower portion coaxially connected with said central hollow stem of said aerosol valve and reciprocatively moving in a cylindrical jacket formed in the base plate of said brush means, and having a disk portion formed on a lower end of said guide tube perpendicular to said guide tube having a first inclined surface formed on said disk portion tilting downwardly and outwardly; and a lateral actuator generally perpendicular to said guide tube having a push-button portion normally protruding outwardly through a slot formed in said cylindrical portion of said brush means, a bifurcate wedge portion protruding inwardly from said push-button portion to tangentially dispose around said guide tube having an upper flat surface laterally sliding along a bottom flat surface of said base plate of said brush means and having a second inclined surface formed on a bottom of said bifurcate wedge portion tilting upwardly and inwardly to be slidably engageable with said first inclined surface of said longitudinal dispenser, a restoring spring plate resiliently retained between said actuator and an inside wall of said cylindrical portion of said brush means to normally protrude said push-button portion outwardly, whereby upon a depression of said push-button portion, said second inclined surface of said lateral actuator will slidingly thrust said first inclined surface of said longitudinal dispenser downwardly to open said aerosol valve for discharging the shaving cream outwardly into the brush bristles.

2. A fountain shaving device according to claim 1, wherein said dispensing controller is generally operated in a chamber defined among said base plate of said brush means, an inside wall of said cylindrical portion of said brush means and said first end portion of said aerosol container.

3. A fountain shaving device according to claim 1, wherein said central guide tube is formed with an annular extension in an inner tubular hole to engage with an upper end of said hollow stem of said aerosol valve.

*4. A fountain shaving device comprising: an aerosol container of shaving cream serving as a handle having a first end portion provided with an aerosol valve therein, having a central hollow stem of the aerosol valve longitudinally protruding outwardly in said first end portion de-*

*pressible for opening the aerosol valve for discharging the shaving cream outwardly through said hollow stem; a brush means having a plurality of bristles planted on a base plate and a cylindrical portion formed under said base plate secured to said first end portion of said aerosol container; and a shaving cream dispensing controller generally formed in said cylindrical portion of said brush means, the improvement which comprises: said shaving cream dispensing controller including a longitudinal dispenser having a central guide tube with its upper end poking into a bundle of brush bristles and having its lower portion coaxially connected with said central hollow stem of said aerosol valve and reciprocatively moving in a cylindrical jacket formed in the base plate of said brush means, and having a disk portion formed on a lower end of said guide tube perpendicular to said guide tube having first inclined surface formed on said disk portion tilting downwardly and outwardly; and a lateral actuator generally perpendicular to said guide tube having a push-button portion normally protruding outwardly through a slot formed in said cylindrical portion of said brush means, a bifurcate wedge portion protruding inwardly from said push-button portion to tangentially dispose around said guide tube having an upper flat surface laterally sliding along a bottom flat surface of said base plate of said brush means and having a second inclined surface formed on a bottom of said bifurcate wedge portion tilting upwardly and inwardly to be slidably engageable with said first inclined surface of said longitudinal dispenser; whereby upon a depression of said push-button portion, said second inclined surface of said lateral actuator will slidingly thrust said first inclined surface of said longitudinal dispenser downwardly to open said aerosol valve for discharging the shaving cream outwardly into the brush bristles.*

*5. A fountain shaving device according to claim 4, wherein said dispensing controller is generally operated in a chamber defined among said base plate of said brush means, an inside wall of said cylindrical portion of said brush means and said first end portion of said aerosol container.*

*6. A fountain shaving device according to claim 4, wherein said central guide tube is formed with an annular extension in an inner tubular hole to engage with an upper end of said hollow stem of said aerosol valve.*

*7. A fountain shaving device according to claim 4, further having a razor means mounted on a container end portion, said razor means including a blade carriage mounted thereon.*

*8. A fountain shaving device according to claim 7, wherein the razor means includes a hollow socket which is mounted on a second container portion opposite the end portion carrying the brush means.*

*9. A fountain shaving device according to claim 7, wherein the razor means includes a hollow socket which fits over the bristles of the brush means and is secured to said first container end portion.*

* * * * *